(12) United States Patent
Shin

(10) Patent No.: US 10,146,480 B2
(45) Date of Patent: Dec. 4, 2018

(54) MEMORY SYSTEM AND OPERATING METHOD OF MEMORY SYSTEM

(71) Applicant: SK hynix Inc., Gyeonggi-do (KR)

(72) Inventor: Beom-Ju Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/266,128

(22) Filed: Sep. 15, 2016

(65) Prior Publication Data

US 2017/0277476 A1    Sep. 28, 2017

(30) Foreign Application Priority Data

Mar. 25, 2016  (KR) ......................... 10-2016-0036137

(51) Int. Cl.
    *G06F 3/06*    (2006.01)
(52) U.S. Cl.
    CPC .......... *G06F 3/0673* (2013.01); *G06F 3/0604* (2013.01); *G06F 3/0659* (2013.01)
(58) Field of Classification Search
    CPC ..... G06F 3/0673; G06F 3/0604; G06F 3/0659
    See application file for complete search history.

(56) References Cited

U.S. PATENT DOCUMENTS

| | | | |
|---|---|---|---|
| 7,844,772 B2 | 11/2010 | Moon et al. | |
| 8,078,794 B2 * | 12/2011 | Lee ...................... | G06F 3/0613 711/103 |
| 2008/0114935 A1 | 5/2008 | Jeong | |
| 2009/0157974 A1 * | 6/2009 | Lasser ................. | G06F 12/0884 711/135 |
| 2011/0252187 A1 * | 10/2011 | Segal .................. | G06F 12/0246 711/103 |
| 2013/0254458 A1 * | 9/2013 | Pittelko ................... | G06F 12/02 711/103 |
| 2013/0254461 A1 * | 9/2013 | Tan ...................... | G06F 12/0246 711/103 |
| 2014/0006898 A1 * | 1/2014 | Sharon ................ | H03M 13/356 714/755 |
| 2016/0225461 A1 * | 8/2016 | Tuers .................. | G11C 16/3427 |

(Continued)

FOREIGN PATENT DOCUMENTS

| | | |
|---|---|---|
| KR | 1020090046944 | 5/2009 |
| KR | 101438716 | 9/2014 |

OTHER PUBLICATIONS

Jung, Dawoon, et al. "Superblock FTL: A superblock-based flash translation layer with a hybrid address translation scheme." ACM Transactions on Embedded Computing Systems (TECS) 9.4 (2010): 40.*

*Primary Examiner* — Ramon A. Mercado
(74) *Attorney, Agent, or Firm* — IP & T Group LLP

(57) ABSTRACT

A memory system may include: a memory device comprising a plurality of pages, which include a plurality of memory cells coupled to a plurality of word lines, and in which data is stored, and a plurality of memory blocks in which the pages are included; and a controller configured to divide the memory blocks into a first group and a second group, perform a command operation corresponding to a command received from a host, and respectively store segments of user data and meta data for the command operation in memory blocks included in the first group or memory blocks included in the second group, in accordance with type information of the user data Included in the command.

16 Claims, 12 Drawing Sheets

(56) References Cited

U.S. PATENT DOCUMENTS

| | | | |
|---|---|---|---|
| 2017/0177226 A1* | 6/2017 | Lee | G06F 1/3287 |
| 2017/0185319 A1* | 6/2017 | Kim | G06F 3/0613 |
| 2017/0185336 A1* | 6/2017 | Byun | G06F 3/0625 |
| 2017/0185348 A1* | 6/2017 | Byun | G06F 3/0656 |
| 2017/0270040 A1* | 9/2017 | Shin | G06F 12/0246 |
| 2017/0277476 A1* | 9/2017 | Shin | G06F 3/0673 |

* cited by examiner

MEMORY SYSTEM AND OPERATING METHOD OF MEMORY SYSTEM

CROSS-REFERENCE TO RELATED APPLICATION

This application claims priority under 35 U.S.C. § 119(a) to Korean Patent Application No. 10-2016-0036137 filed on Mar. 25, 2016 in the Korean Intellectual Property Office, the disclosure of which is incorporated herein by reference in its entirety.

TECHNICAL FIELD

Various embodiments of the present invention relate generally to a memory system and, more particularly, to a memory system that processes data to a memory device and an operating method thereof.

DISCUSSION OF THE RELATED ART

The computer environment paradigm has shifted to ubiquitous computing systems that can be used anytime and anywhere. Due to this fact the use of portable electronic devices such as mobile phones, digital cameras, and notebook computers has rapidly increased. These portable electronic devices generally use a memory system having memory devices for storing data (i.e., a data storage device). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Various embodiments are directed to a memory system capable of minimizing complexity and performance deterioration thereof, and maximizing efficiency in use of a memory device, thus making it possible to rapidly and reliably process data to the memory device, and an operating method thereof.

In an embodiment, a memory system may include: a memory device including a plurality of memory blocks; and a controller suitable for dividing the memory blocks into a first group and a second group, performing a command operation corresponding to a command received from a host, and respectively storing segments of user data and meta data for the command operation in memory blocks included in the first group or memory blocks included in the second group, in accordance with at least one information included in the meta data information of the user data.

the controller may classify the segments into a first type and a second type in accordance with type information included in the meta data information of the user data, and the controller stores segments of the first type in the memory blocks of the first group, and stores segments of the second type in the memory blocks of the second group.

The segments of the first type may be segments of the user data and meta data for which, after being stored in the memory blocks of the first group, only a read operation of the command operation is performed.

The controller may check a read count in accordance with the read operation for the segments of the first type, and the controller may classify the segments of the first type into a third type and a fourth type in accordance with the read count.

The controller may migrate and may store segments of the third type stored in the memory blocks of the first group, to a first memory block of the first group, and the controller may migrate and may store segments of the fourth type stored in the memory blocks of the first group, to a second memory block of the first group.

The first memory block may include a Multi Level Cell (MLC) memory block, and the second memory block includes a Triple Level Cell (TLC) memory block.

The segments of the third type may be segments of hot data, and the segments of the fourth type are segments of cold data.

The segments of the second type may be segments of the user data and meta data for which, after being stored in the memory blocks of the first group, an update operation of the command operation is performed.

The controller may store the segments of the second type in first memory blocks, among the memory blocks of the second group, and then may migrate and may store the segments of the second type to second memory blocks.

The first memory blocks may include Single Level Cell (SLC) memory blocks and Multi Level Cell (MLC) memory blocks, and wherein the second memory blocks may include the MLC memory blocks and Triple Level Cell (TLC) memory blocks.

In an embodiment, an operating method of a memory system may include: receiving a command from a host; checking user data included in the command and type information of the user data; dividing a plurality of memory blocks of a memory device into a first group and a second group; and performing a command operation corresponding to the command, and storing segments of the user data and meta data for the command operation in memory blocks included in the first group or memory blocks included in the second group, in accordance with the type information.

The storing may include: classifying the segments into a first type and a second type in accordance with the type information; and storing segments of the first type in the memory blocks of the first group, and storing segments of the second type in the memory blocks of the second group.

The segments of the first type may be segments of the user data and meta data for which, after being stored in the memory blocks of the first group, only a read operation of the command operation is performed.

The operating method may further include: checking a read count in accordance with the read operation for the segments of the first type; and classifying the segments of the first type into a third type and a fourth type in accordance with the read count.

The operating method may further include: migrating and storing segments of the third type stored in the memory blocks of the first group, to a first memory block of the first group; and migrating and storing segments of the fourth type stored in the memory blocks of the first group, to a second memory block of the first group.

The first memory block may include a Multi Level Cell (MLC) memory block, and the second memory block may include a Triple Level Cell (TLC) memory block.

The segments of the third type may be segments of hot data, and the segments of the fourth type may be segments of cold data.

The segments of the second type may be segments of the user data and meta data for which, after being stored in the memory blocks of the first group, an update operation of the command operation is performed.

The storing may include migrating and storing the segments of the second type in first memory blocks, among the memory blocks of the second group, and then migrating and storing the segments of the second type to second memory blocks.

The first memory blocks may include Single Level Cell (SLC) memory blocks and Multi Level Cell (MLC) memory blocks, and the second memory blocks may include the MLC memory blocks and Triple Level Cell (TLC) memory blocks.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which.

DETAILED DESCRIPTION

Figure 1:
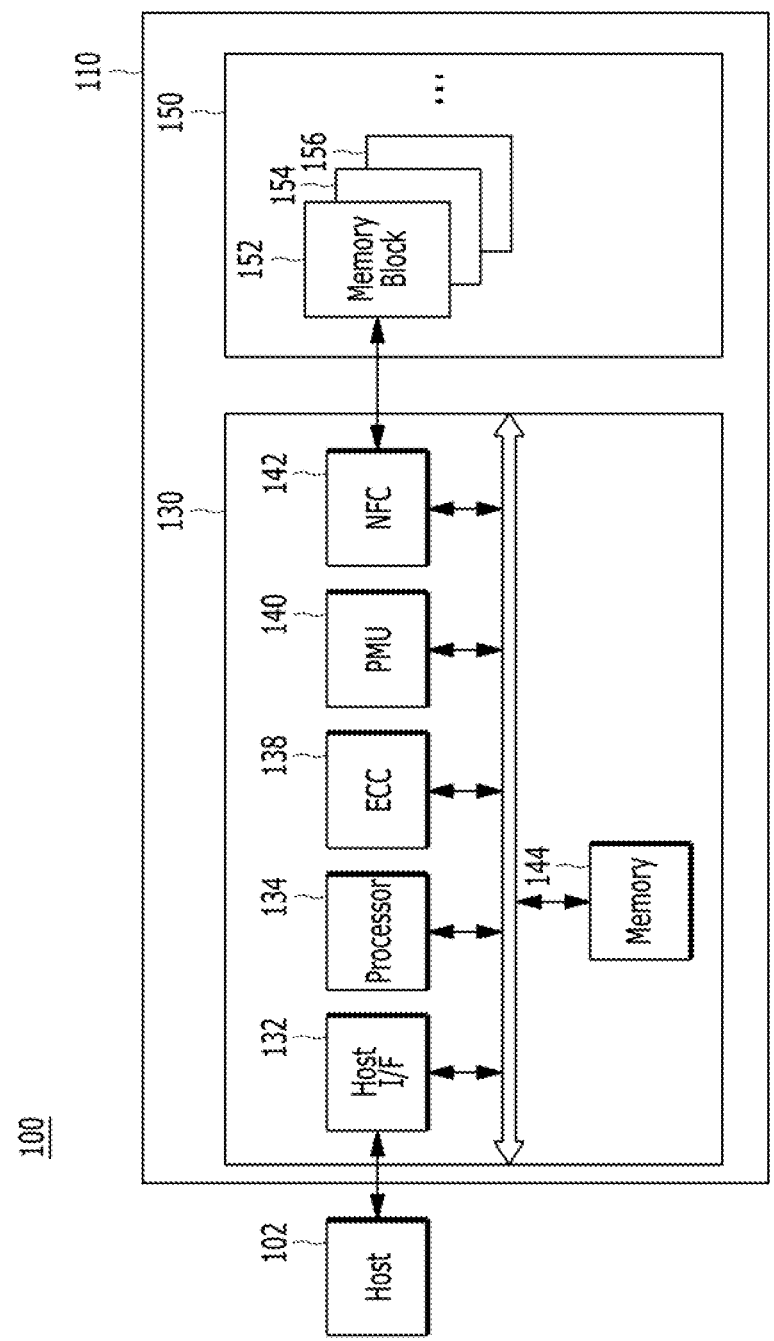
FIG. 1 is a diagram illustrating a data processing system including a memory system, in accordance with an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be understood that, although the terms "first", "second", "third", and the like may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known; process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a data processing system 100 including a memory system 110, in accordance with an embodiment of the present invention.

Referring to FIG. 1, the data processing system 100 may include a host 102 and the memory system 110.

The host 102 may include a portable electronic device such as a mobile phone, an MP3 player and a laptop computer or an electronic device such as a desktop computer, a game player, a television (TV) and a projector.

The memory system 110 may operate in response to a request from the host 102, and in particular, store data to be accessed by the host 102. That is, the memory system 110 may be used as a main memory system or an auxiliary memory system of the host 102. The memory system 110 may be implemented with any one of various storage devices, according to the protocol of a host interface to be electrically coupled with the host 102. The memory system 110 may be implemented with any one of various storage devices such as a solid state drive (SSD), a multimedia card (MMC), an embedded MMC (eMMC), a reduced size MMC (RS-MMC) and a micro-MMC, a secure digital (SD) card, a mini-SD, a micro-SD a universal serial bus (USB) storage device a universal flash storage (UFS) device, a compact flash (CF) card, a smart media (SM) card, a memory stick, and the like.

The storage devices for the memory system 110 may be implemented with a volatile memory device, such as a dynamic random access memory (DRAM) and a static random access memory (SRAM) or a nonvolatile memory device, such as a read only memory (ROM), a mask ROM (MROM), a programmable ROM (PROM) an erasable programmable ROM (EPROM), an electrically erasable programmable ROM (EEPROM), a ferroelectric random access memory (FRAM), a phase change RAM (PRAM) a magnetoresistive RAM (MRAM) and a resistive RAM (RRAM).

The memory system 110 may include a memory device 150 for storing data to be accessed by the host 102, and a controller 130 which may control storage of data in the memory device 150.

The controller 130 and the memory device 150 may be integrated into a single semiconductor device. For instance, the controller 130 and the memory device 150 may be integrated into a single semiconductor device configured as a solid state drive (SSD). When the memory system 110 is used as a SSD, the operation speed of the host 102 that is electrically coupled with the memory system 110 may be increased significantly.

The controller 130 and the memory device 150 may be integrated a single semiconductor device configured as a memory card. The controller 130 and the memory card 150 may be integrated a single semiconductor device configured as a memory card such as a Personal Computer Memory Card International Association (PCMCIA) card, a compact flash (CF) card, a smart media (SM) card (SMC) a memory stick, a multimedia card (MMC), an RS-MMC a micro-MMC, a secure digital (SD) card, a mini-SD, a micro-SD, an SDHC, and a universal flash storage (UFS) device.

For another instance, the memory system 110 may be configured as or part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 of the memory system 110 may retain stored data when a power supply is interrupted and, in particular, store the data provided from the host 102 during a write operation. The memory device 150 of the memory system 110 may provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory cells may be single level or multi-level cells. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and store the data provided from the host 102 into the memory device 150. Therefore, the controller 130 may control the overall operations of the memory device 150, such as read, write, program and erase operations.

In the illustrated embodiment of FIG. 1, the controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols, such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and the like.

The ECC unit 138 may detect and correct errors in the data read from the memory device 150 during a read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation, such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. For example, the NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with a volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and the like.

The processor 134 may control the general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
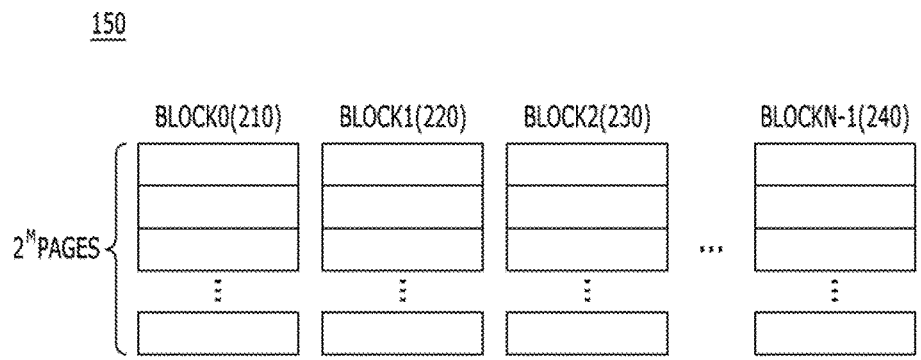
FIG. 2 is a diagram illustrating a memory device in the memory system shown in FIG. 1.

FIG. 2 is a schematic diagram illustrating the memory device 150 shown in FIG. 1.

Referring to FIG. 2, the memory device 150 may include a plurality of memory blocks. For example the memory device 150 may include zeroth to (N−1)$^{th}$ blocks 210 to 240. Each of the plurality of memory blocks 210 to 240 may include a plurality of pages. For example, each of the plurality of memory blocks 210 to 240 may include $2^M$ number of pages ($2^M$ PAGES), to which the present invention will not be limited. Each of the plurality of pages may include a plurality of memory cells to which a plurality of word lines are electrically coupled.

Additionally, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data (e.g., two or more-bit data). An MLC memory block including a plurality of pages which are implemented with memory cells that are each capable of storing 3-bit data may be defined as a triple level cell (TLC) memory block.

Each of the plurality of memory blocks 210 to 240 may store the data provided from the host 102 during a write operation, and may provide stored data to the host 102 during a read operation.

Figure 3:
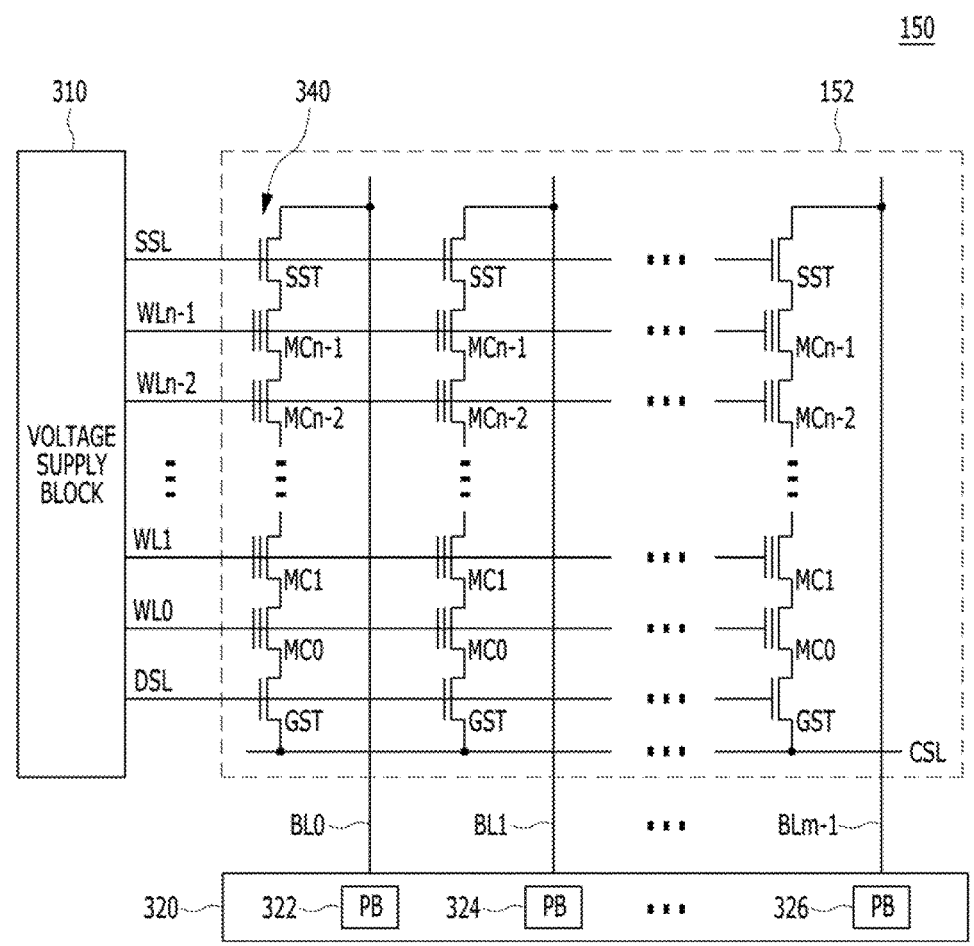
FIG. 3 is a circuit diagram illustrating a memory block in a memory device, in accordance with an embodiment of the present invention.

FIG. 3 is a circuit diagram illustrating one of the plurality of memory blocks 152 to 156 shown in FIG. 1 and which is generally designated in FIG. 3 with numeral 300.

Referring to FIG. 3, the memory block 300 of the memory device 150 may include a plurality of cell strings 340 which are electrically coupled to bit lines BL0 to BLm−1, respectively. The cell string 340 of each column may include at least one ground select transistor GST and at least one source select transistor SST. A plurality of memory cells or a plurality of memory cell transistors MC0 to MCn−1 may be electrically coupled in series between the select transistors GST and SST. The respective memory cells MC0 to Mn−1 may be configured by multi-level cells (MLC) each of which stores data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, memory block 300 which is configured by NAND flash memory cells, it is to be noted that the memory block 300 is not limited to NAND flash memory cells and may be realized by NOR flash memory cells, hybrid flash memory cells in which at least two memory cells are combined, or one-NAND flash memory cell in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Additionally, during a program operation, the read/write circuit 320 may serve as a write driver which drives bit lines according to data to be stored in the memory cell array. The read/write circuit 320 may receive data to be written in the memory cell array, from a buffer (not shown), during a program operation, and may drive the bit lines according to the inputted data. The read/write circuit 320 may include a plurality of page buffers 322, 324 and 326 respectively corresponding to columns or bit lines, or pairs of columns or pairs of bit lines, and a plurality of latches (not shown) may be included in each of the page buffers 322, 324 and 326.

FIGS. 4 to 11 are diagrams illustrating the memory device 150 shown in FIG. 1.

Figure 4:
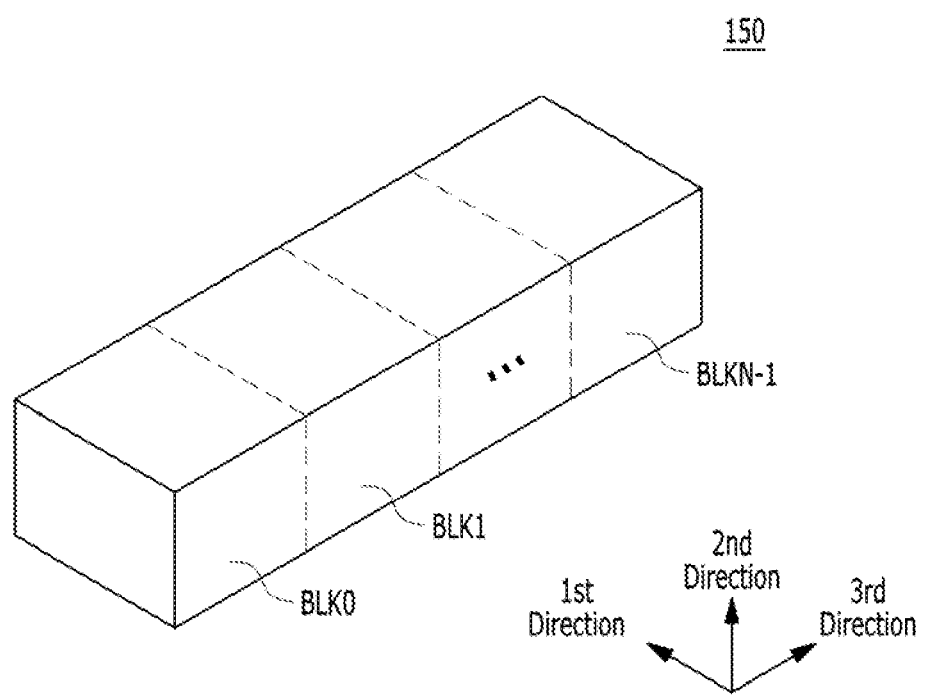
FIGS. 4 to 11 are diagrams illustrating the memory device shown in FIG. 2.

FIG. 4 is a block diagram illustrating an example of the plurality of memory blocks included in the memory device 150 shown in FIG. 1.

Referring to FIG. 4, the memory device 150 may include a plurality of memory blocks BLK0 to BLKN−1. Each of the memory blocks BLK0 to BLKN−1 may be realized in a three-dimensional (3D) structure or a vertical structure. The respective memory blocks BLK0 to BLKN−1 may include structures which extend in first to third directions (e.g., an x-axis direction, a y-axis direction and a z-axis direction).

The respective memory blocks BLK0 to BLKN−1 may include a plurality of NAND strings NS which extend in the second direction. The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. That is, the respective memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
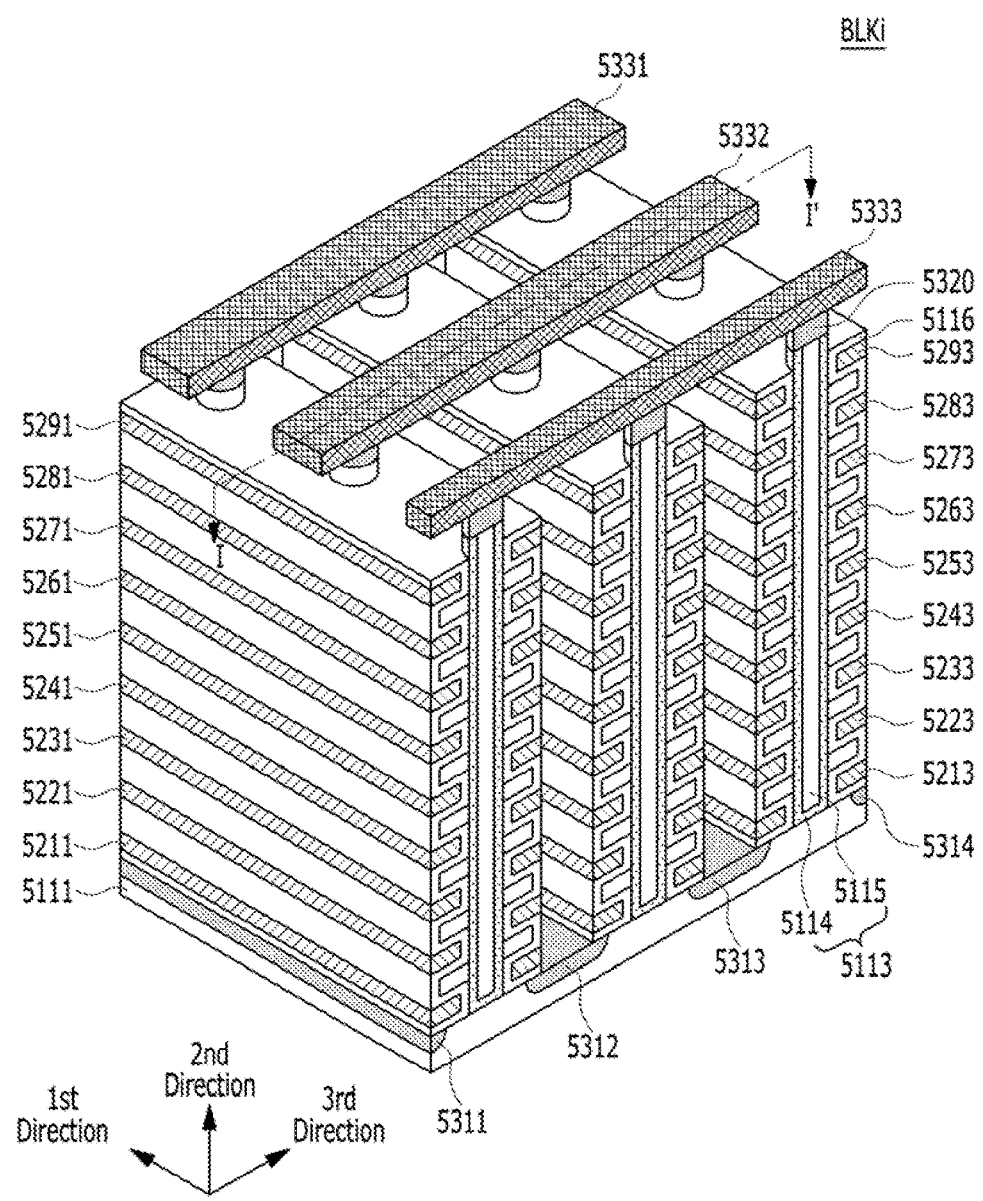
Figure 6:
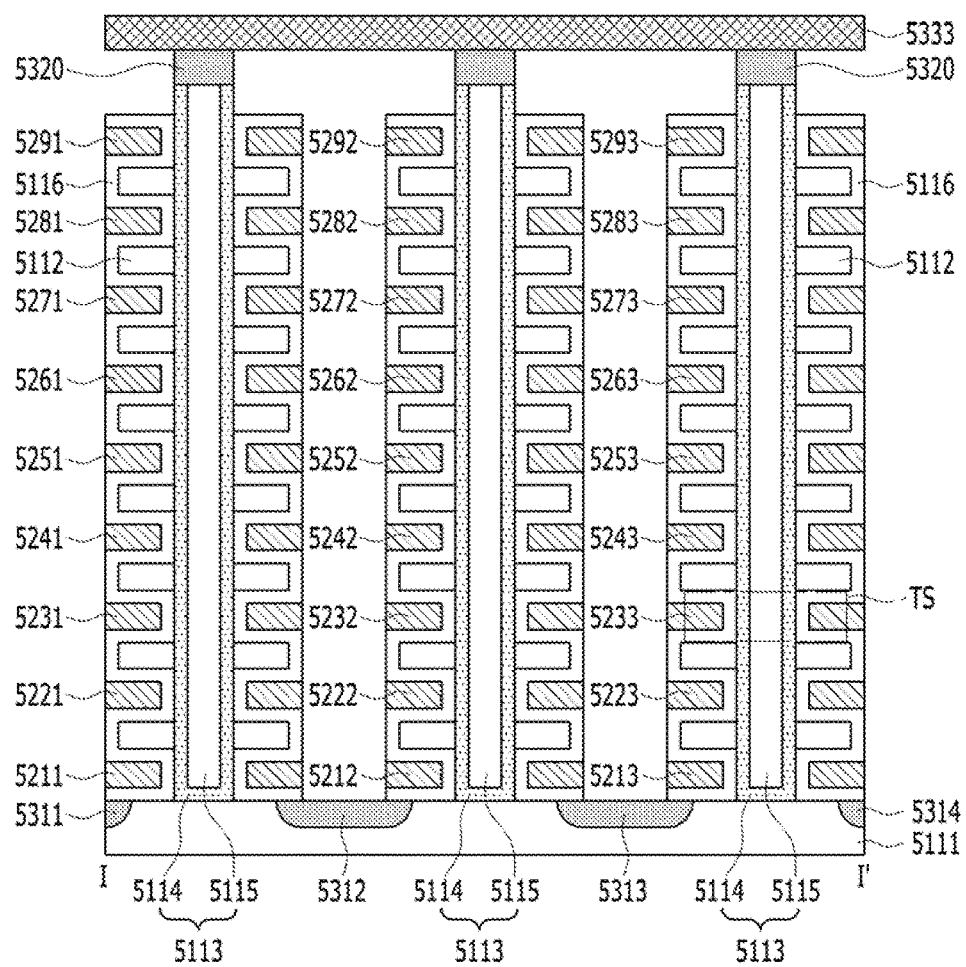

FIG. 5 is a perspective view of one BLKi of the plural memory blocks BLK0 to BLKN−1 shown in FIG. 4. FIG. 6 is a cross-sectional view taken along a line I-I' of the memory block BLKi shown in FIG. 5.

Referring to FIGS. 5 and 6, a memory block BLKi among the plurality of memory blocks of the memory device 150 may include a structure which extends in the first to third directions.

A substrate 5111 may be provided. The substrate 5111 may include a silicon material doped with a first type impurity. The substrate 5111 may include a silicon material doped with a p-type impurity or may be a p-type well (e.g., a pocket p-well) and include an n-type well which surrounds the p-type well. While it is assumed that the substrate 5111 is p-type silicon, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the substrate 5111. The plurality of doping regions 5311 to 5314 may be doped with an n-type impurity. Although in this embodiment the first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 which extend in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 531 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. That is, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 which extend in the first direction may be provided between the dielectric materials 5112. The conductive material 5291 which extends in the first direction may be provided over the uppermost dielectric material 5112. The conductive materials 5211 to 5291 which extend in the first direction may be a metallic material. The conductive materials 5211 to 5291 which extend in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. Although in this embodiment the drains 5320 include n-type silicon, it is to be noted that the drains 5320 are not limited to being n-type silicon. Furthermore, the width of each drain 5320 may be larger than the width of each corresponding pillar 5113. Each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333 which extend in the third direction may be electrically coupled with through contact plugs. The conductive materials 5331 to 5333 which extend in the third direction may be a metallic material. The conductive materials 5331 to 5333 which extend in the third direction may be a conductive material such as polysilicon.

In FIGS. 5 and 6 the respective pillars 5113 may form strings together with the dielectric layer 5116 and the conductive materials 5211 to 5291, 5212 to 5292 and 5213 to 5293 which extend in the first direction. The respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
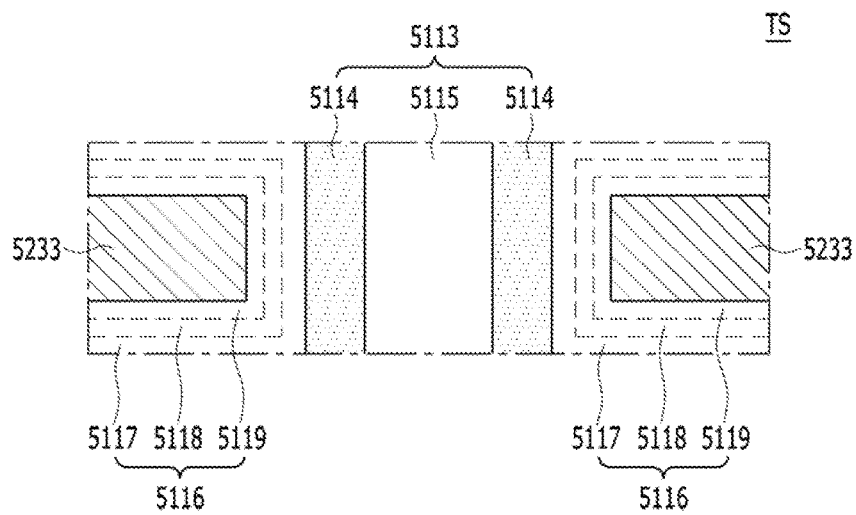

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. That is, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. That is, the gates or the control gates may extend in the first direction and form word lines, at least two select lines, at least one source select line SSL and at least one ground select line GSL.

The conductive materials 5331 to 5333 which extend in the third direction may be electrically coupled to one end of the NAND strings NS. The conductive materials 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Furthermore, the memory block BLKi may include a plurality of NAND strings NS which extend in a direction perpendicular to the substrate 5111, such as the second direction, and may serve as a NAND flash memory block, for example, of a charge capturing type memory, in which a plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 16 layers or any multiple of layers. That is, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
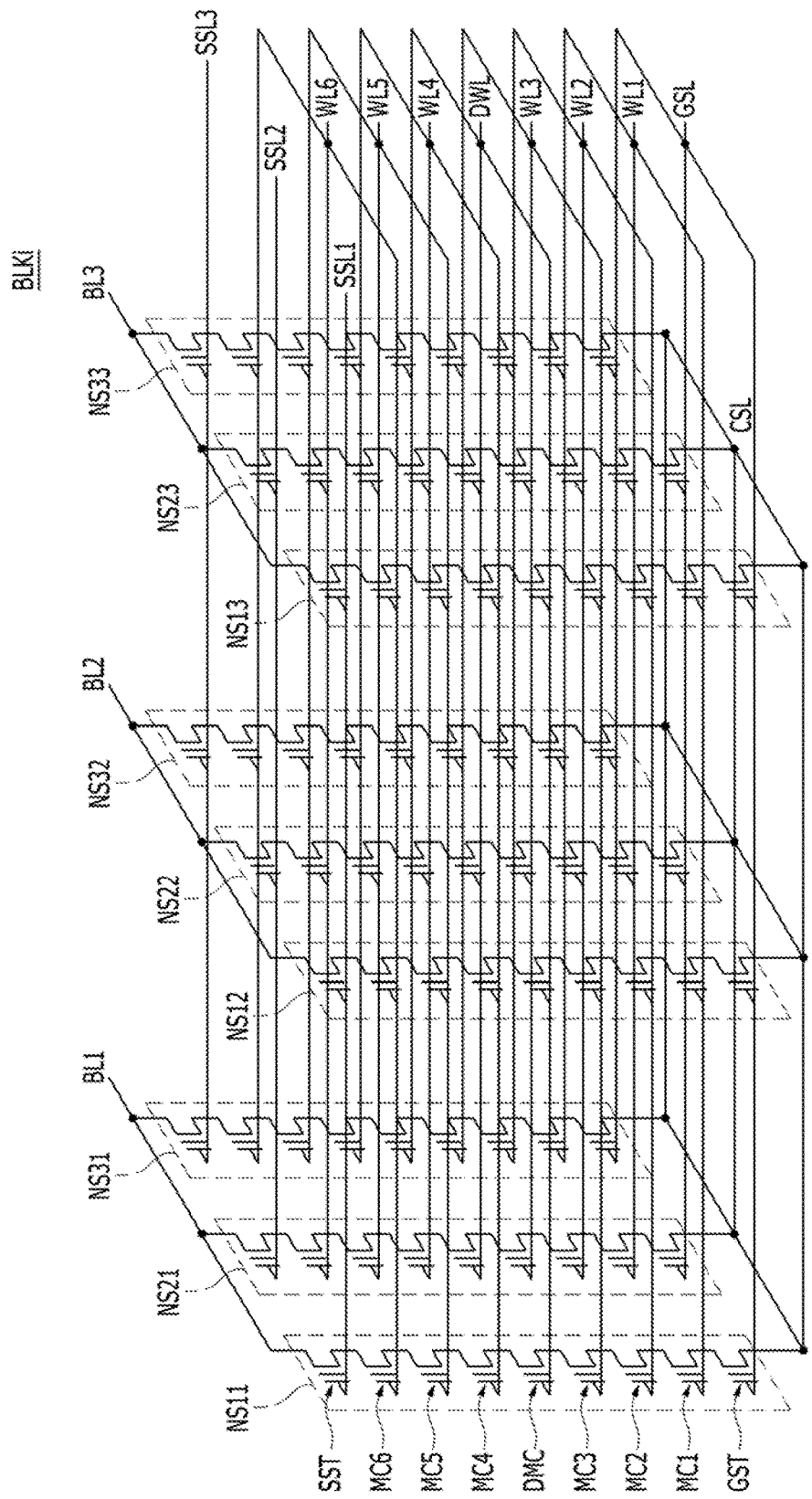

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns, and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line B13 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. That is, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 which extend in the first direction may be provided. The conductive materials 5211 to 5291, 5212 to 5292 and 5213 to 5293 which extend in the first direction may be electrically coupled in common to upper layers through contacts. At the upper layers the conductive materials 5211 to 5291, 5212 to 5292 and 5213 to 5293 which extend in the first direction may be electrically coupled. The ground select transistors GST of the NAND strings NS in the same row may share the ground select line GSL. Further, the ground select transistors GST of the NAND strings NS in different rows may share the ground select line GSL. That is, the NAND strings NS11 to NS13 NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

As shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8 the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system in accordance with an embodiment implemented with a three-dimensional (3D) nonvolatile memory device different from the first structure.

Figure 9:
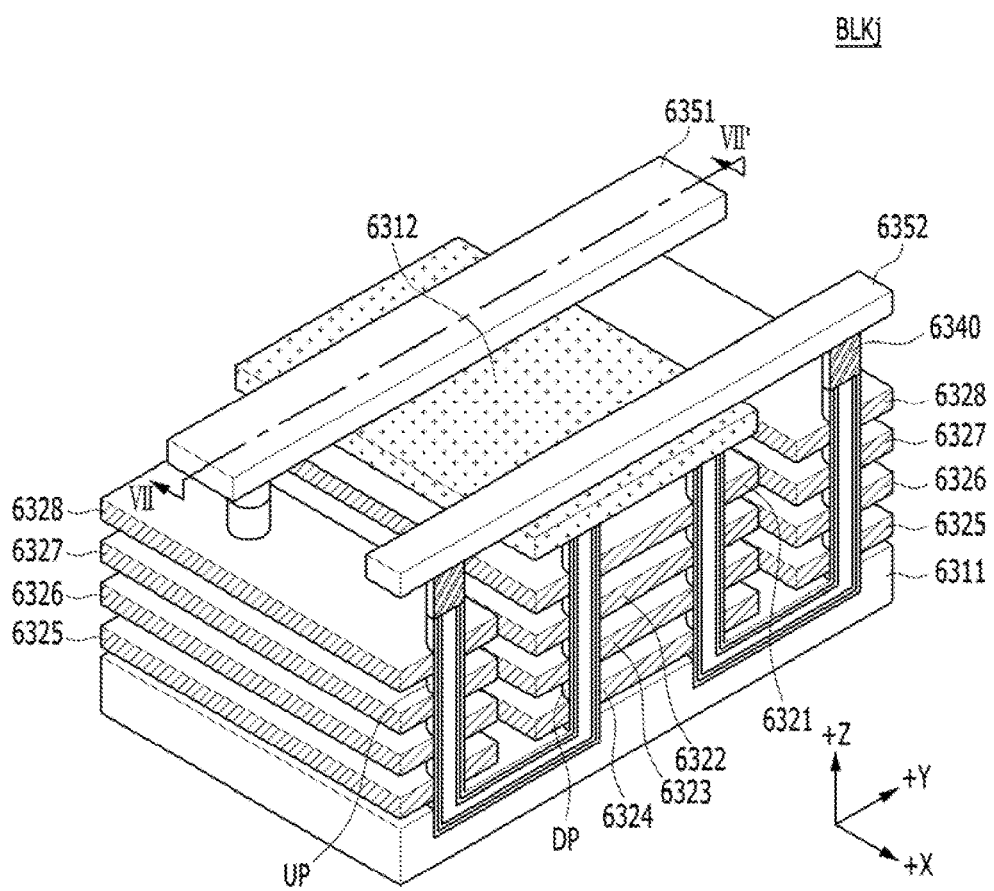

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line VII-VII' of FIG. 9.

Figure 10:
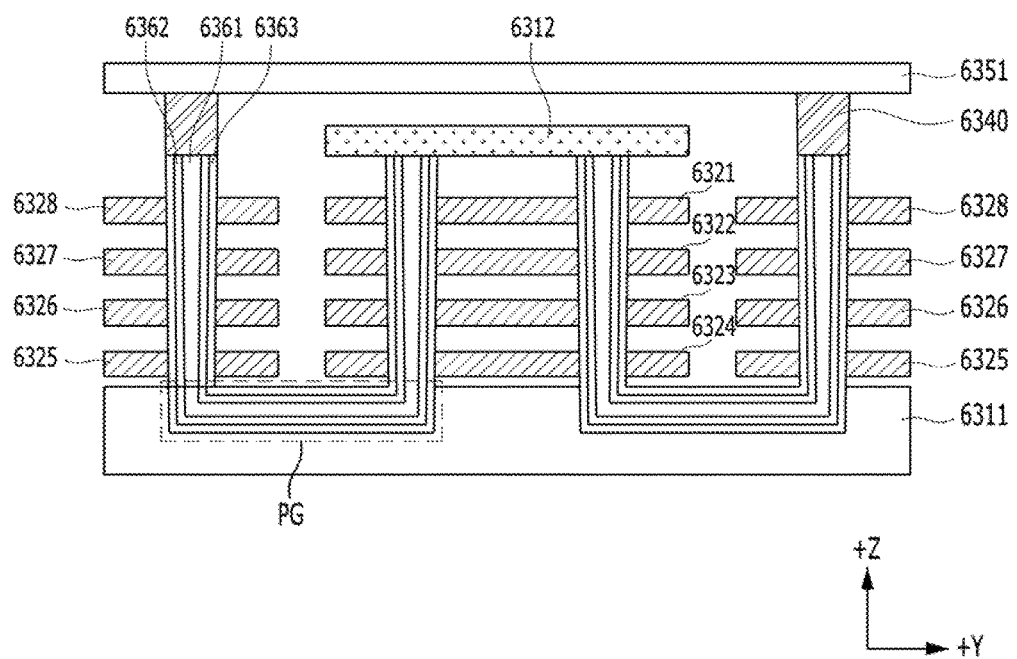

Referring to FIGS. 9 and 10, the memory block BLKj among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. Although in this embodiment the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 which extend in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Additionally, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 which extend in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2 and a ground select transistor GST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
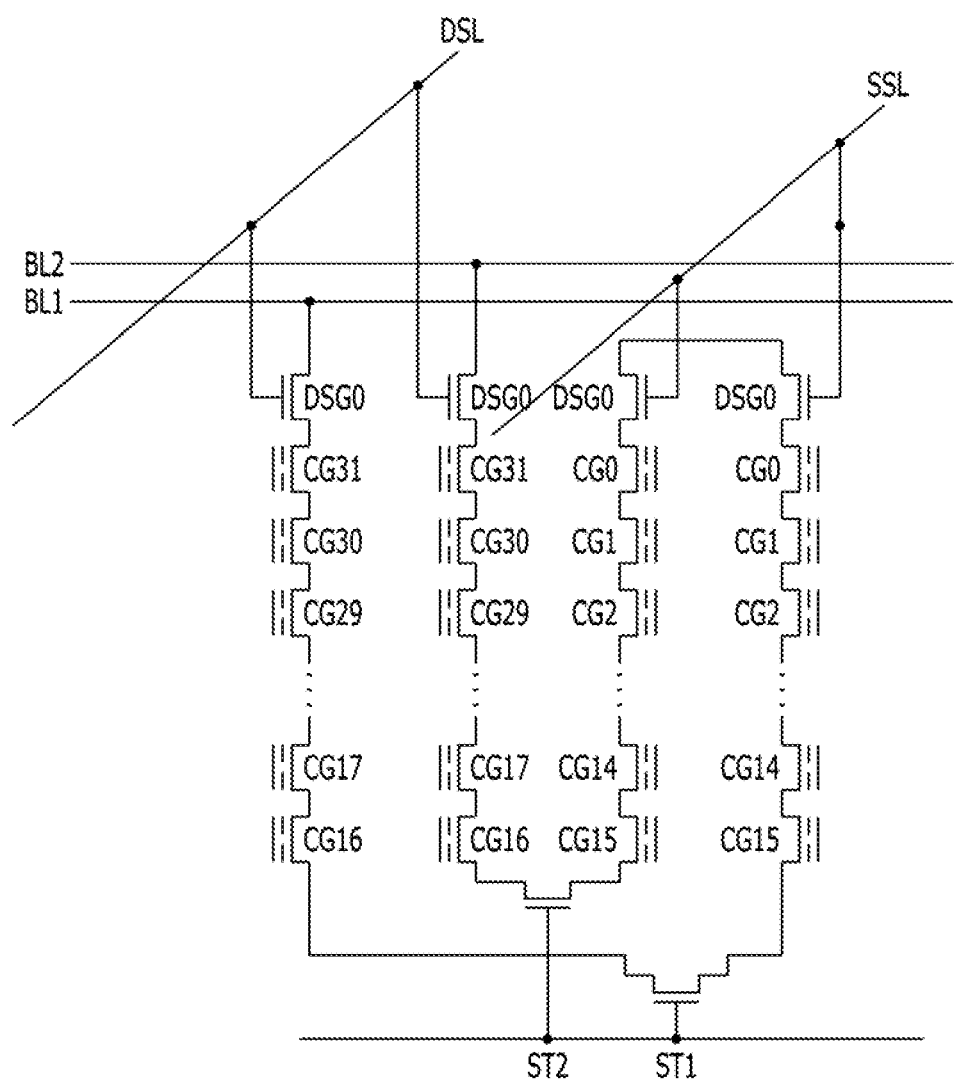

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

That is, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Hereinafter, processing data to a memory device in a memory system in accordance with an embodiment, particularly, a command operation corresponding to a command received from a host 102, for example, an operation of processing command data to a memory device 150, will be described in detail with reference to FIGS. 12 to 14.

Figure 12:
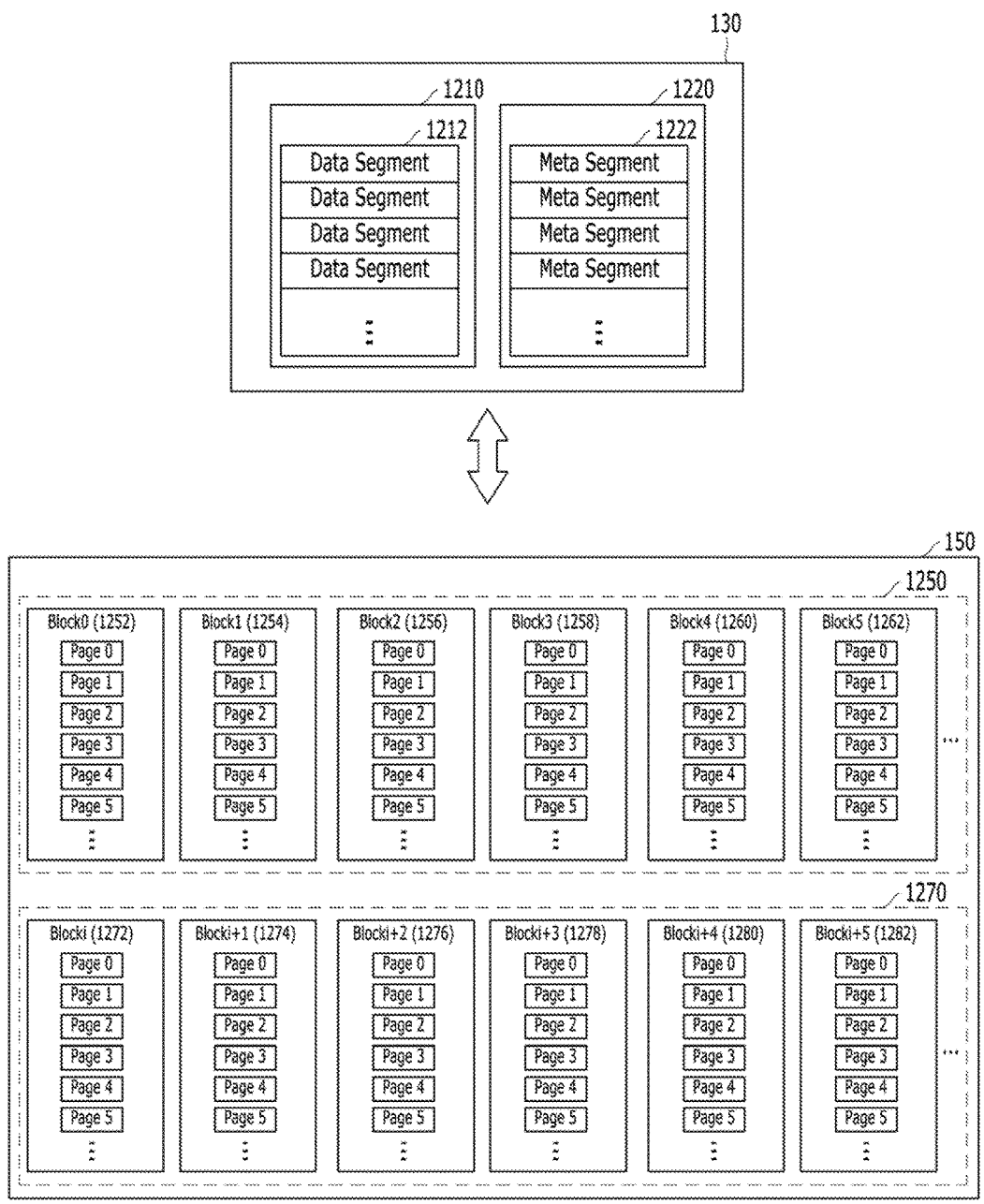
FIGS. 12 and 13 are diagrams illustrating an operation of processing data to a memory device in a memory system, in accordance with an embodiment of the present invention.
Figure 13:
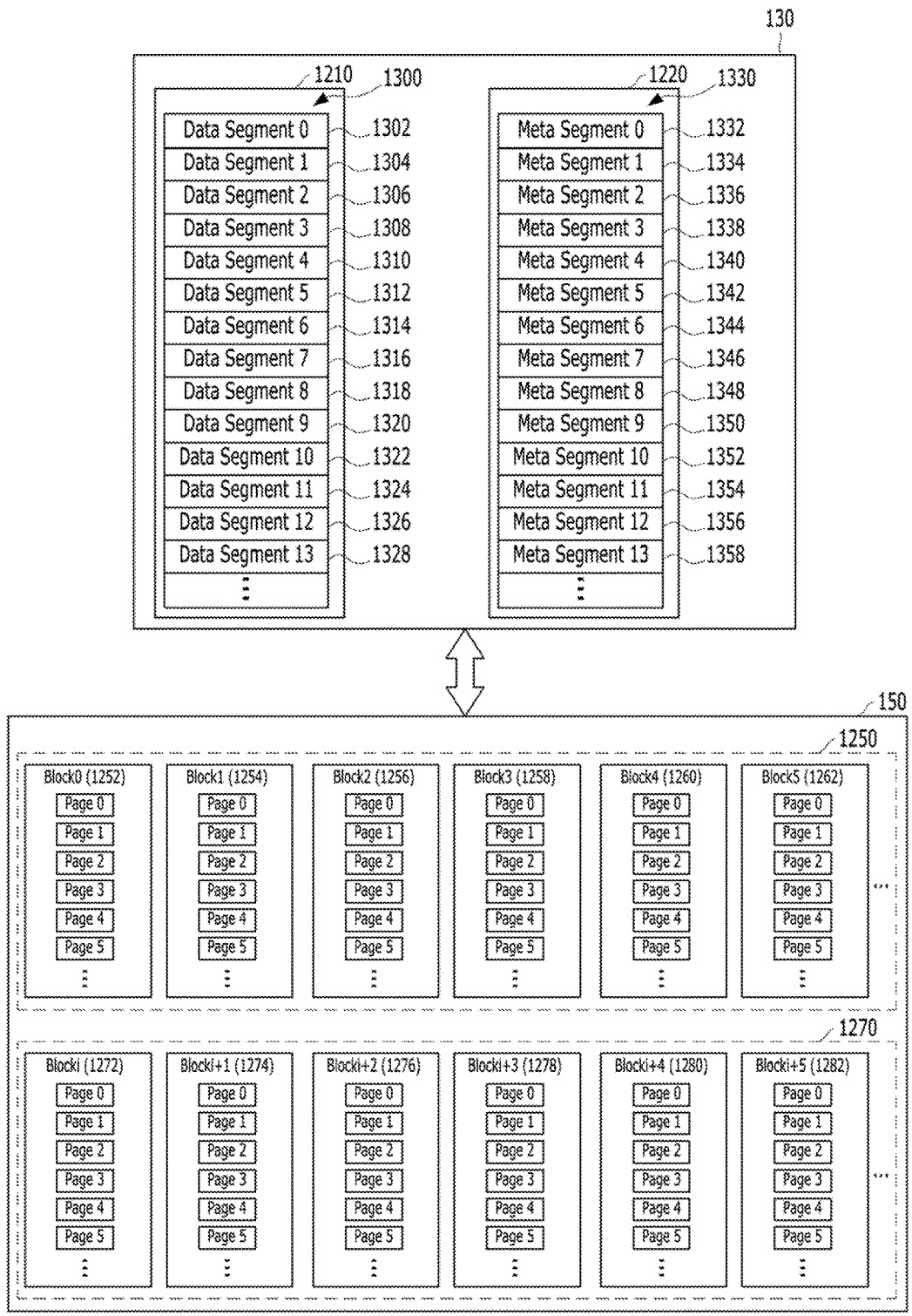
Figure 14:
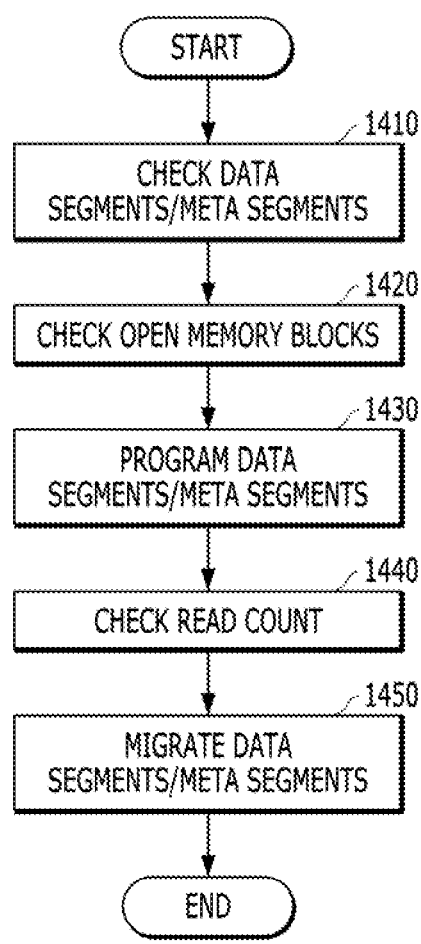
FIG. 14 is a flowchart illustrating an operating process of a memory system, in accordance with an embodiment of the present invention.

FIGS. 12 to 14 are diagrams illustrating a data processing operation to a memory device in a memory system in accordance with an embodiment of the present invention. Hereinafter, for the sake of convenience in explanation, a description will be provided, as an example, for data processing in the case where the memory system 110 illustrated in FIG. 1 writes and stores command data corresponding to a command received from the host 102 (e.g., write data corresponding to a write command) in a plurality of memory blocks included in the memory device 150. Also, a description will be provided for data processing in the case of generating and updating command data and meta data for a plurality of memory blocks (e.g., meta data including map data corresponding to data write to the memory blocks), and storing the generated and updated meta data in a plurality of memory blocks, and then performing a command operation to the memory device 150.

The data processing operation in the memory system may be performed by the controller 130. In an embodiment, the processor 134 included in the controller 130 may perform the data processing operation through an FTL. In the following description an example is provided, for the case where the controller 130 processes data in a write operation performed in response to a write command received from the host 102. That is, the controller 130 may perform a write operation which includes writing and storing user provided data corresponding to a received write command in one or more memory blocks of the memory device 150. Also, the controller 130 may generate and update user data corresponding to a command operation and meta data for one or more memory blocks, and writing and storing the generated and updated meta data in one or more memory blocks of the memory device 150. For example, the meta data may include map data corresponding to the storage of user data in the memory blocks.

First and second map data may be included in the meta data. For example, the meta data may include first map data having logical/physical (L2P: Logical to Physical) information (hereinafter, referred to as 'logical information'), and second map data having physical/logical (P2L: Physical to Logical) information (hereinafter, referred to as 'physical information').

The meta data may also include at least one of the following pieces of information including information about command data corresponding to a command received from the host 102, information about a command operation corresponding to the command, information about the memory blocks of the memory device 150 for performing the command operation, and information such as map data corresponding to the command operation. Hence, in an embodiment, with the exception of user data which correspond to the command received from the host 102, all other information and data may be included in the meta data.

For example, in an embodiment where the controller 130 receives a write command from the host 102, the controller 130 writes and stores user data received together with to the write command and which correspond to the received write command and meta data in one or more memory blocks of the memory device 150. The controller 130 may write and store the user data in open memory blocks or free memory blocks. The controller 130 may write and store the meta data in open memory blocks or free memory blocks. The meta data may include mapping information of a logical address to a physical address for user data stored in the memory blocks (i.e., first map data including the L2P map table in which logical information is recorded), and mapping information of the physical address to the logical address for the user data stored in the memory blocks (i.e., second map data including the P2L map table in which physical information is recorded).

In particular, when a write command is received from the host 102, meta data information about user data corresponding to the write command, such as Logical Block Address (LBA) information, size information and type information about the user data, is checked. In accordance with the LBA information, the size information, type information, etc., the user data corresponding to the write command is written and stored in corresponding one or more memory blocks of the memory device 150, and meta data including the first map data, the second map data, etc. for the user data stored in the memory blocks is stored in the memory blocks.

The memory blocks of the memory devices 150 may be divided into a plurality of memory block groups. The plurality of memory block groups may include a first memory block group and a second memory block group. In accordance with LBA information, size information, type information, etc. about the received user data, data segments of the user data may be classified, and then stored in one or more memory blocks included in the first memory block group and one or more memory blocks included in the second memory block group. Further, meta segments of meta data are stored in the memory blocks of the memory device 150. For example, the meta segments of the meta data are stored in the memory blocks included the first memory block group and the memory blocks included in the second memory block group.

In an embodiment, the memory device 150 may include a plurality of memory dies, each of the memory dies including a plurality of planes, and each of the planes including a plurality of memory blocks. As described above, the plurality of memory blocks may be divided into a first and second memory block groups. User data and meta data of a command operation corresponding to a command received from the host 102 are programmed and stored in, among the memory blocks of the memory device 150, memory blocks included in the first memory block group or memory blocks included in the second memory block group. For example, the user data and the meta data may be programmed and stored in a super memory block in the first memory block group or the second memory block group through a one-shot program.

In an embodiment, the first memory block group of the memory device 150 may include Multi Level Cell (MLC) memory blocks such as Triple Level Cell (TLC) memory blocks. The second memory block group, may include Single Level Cell (SLC) memory blocks and also MLC memory blocks, such as TLC memory blocks are included. In the case where user data and meta data are stored in memory blocks included in the second memory block group, the SLC memory blocks or the MLC memory blocks of the second memory block group may be used as buffers.

Hence, user data and meta data which are stored in the first memory block group, they are stored in the MLC memory blocks or the TLC memory blocks that are included in the first memory block. While user data and meta data which are stored in the second memory block group are stored using the SLC memory blocks included in the second memory block group of the memory device 150 as buffers, in the SLC memory blocks and then migrated to and stored in the MLC memory blocks or the TLC memory blocks that are included in the second memory block group of the memory device 150. Alternatively, the user data and the meta data which are stored in the second memory block group of the memory blocks of the memory device 150 may be stored, using the MLC memory blocks as buffers, in the MLC memory blocks and then migrated to and stored in the TLC memory blocks.

Furthermore, in the memory device 150, a super memory block included in the first memory block group or the second memory block group may include a plurality of memory blocks (e.g., a first memory block and a second memory block). In the case where the first memory block is an arbitrary memory block included in a first plane of a first memory die of the plurality of memory dies, the second memory block may be another arbitrary memory block included in the first plane of the first memory die, may be an arbitrary memory block included in a second plane of the first memory die, or may be an arbitrary memory block included in a plurality of planes of a second memory die of the plurality of memory dies. That is, the second memory block may be a memory block which is included in the same memory die and the same plane as those of the first memory block, may be a memory block which is included in a different plane in the same memory die as that of the first memory block or may be a memory block which is included in a different memory die from the first memory block.

As an example for illustration purposes only, a case of programming and updating user data and meta data to memory blocks of the first and second memory block groups of the memory device 150 will be described. For example, user data and meta data may be programmed and updated to a super memory block including one or more memory blocks of the first and second memory block groups. In the same manner as described above, the memory blocks of the super memory block may be memory blocks which are included in the same plane of the same memory die, may be memory blocks which are included in different planes of the same memory die, or may be memory blocks which are included in different memory dies.

Data segments of the user data and meta segments of the meta data may be programmed (i.e., stored) in the super memory block included in the first and second memory block groups of the memory blocks of the memory device 150, in the same manner as described above, in accordance with information about the user data corresponding to the write command. For example, the meta data information about the user data may include at least one information selected from the group including information size information and type information about the user data.

In this regard, in the write command received from the host 102, user data and meta data information about the user data are included. For example, the meta data information about the user data may include at least one information selected from the group including information size information and type information of the user data. In particular, a system included in the host 102, such as a file system or an operating system, may include the user data corresponding to the write command and type information of the user data in the write command. The system may transmit the user data and type information about the user data to the controller 130 of the memory system 110. The type information of the user data may be information indicating an attribute of the user data. The type information of the user data may be included in a reserved region, a tag region, a data set region or the like of the write command. The write command may include context information or identification information indicating whether the user data stored in the memory blocks is updated after the user data is stored in one or more memory blocks of the memory device 150.

For example, with regard to the user data stored in the memory blocks of the memory device 150 according to a received write command, the type information of the user data may include information indicating whether the user data is user data for which only a read operation is performed as only a read command is received from the host 102, or is user data for which a write operation (i.e., an update operation) is performed as a write command is received from the host 102. In addition, the type information of the user data may include information indicating a process pattern (e.g., a read/program/write pattern) of the user data, or a data type (e.g., random/sequential/locality) of the user data. In accordance with the type information of the user data, the user data and the meta data may be programmed and stored in memory blocks included in the first memory block group or memory blocks included in the second memory block group. Hereinafter, an embodiment of the data processing operation will be described in more detail with reference to FIGS. 12 and 13.

Referring to FIG. 12, the controller 130 writes and stores data corresponding to a command received from the host 102 in, among a plurality of memory blocks included in the memory device 150, memory blocks 1252, 1254, 1256, 1258, 1260, and 1262 included in a first memory block group 1250 or memory blocks 1272, 1274, 1276, 1278, 1280, and 1282 included in a second memory block group 1270. For example, the data corresponding to the command received from the host 102 may be user data corresponding to a write command. Furthermore, in accordance with a write operation of the user data, the controller 130 writes and stores meta data including map data for the user data in, among the plurality of memory blocks included in the memory device 150, the memory blocks 1252, 1254, 1256, 1258, 1260, and 1262 included in the first memory block group 1250 or the memory blocks 1272, 1274, 1276, 1278, 1280, and 1282 included in the second memory block group 1270.

As described above, the memory device 150 includes a plurality of memory dies, each of the memory dies includes a plurality of planes, and each of the planes includes a plurality of memory blocks. The memory blocks of the memory device 150 are divided into a plurality of memory block groups, for example, the first memory block group 1250 and the second memory block group 1270. Furthermore, in the memory blocks of the memory device 150, the first memory block group 1250 includes MLC memory blocks such as TLC memory blocks, and the second memory block group includes bot SLC memory blocks and MLC memory blocks such as TLC memory blocks.

For instance, in the memory blocks of the memory device 150, the first memory block group 1250 includes, as MLC memory blocks, a zeroth block 1252, a first block 1254 and a second block 1256, and includes, as TLC memory blocks, a third block 1258, a fourth block 1260 and a fifth block 1262. Furthermore, the second memory block group 1270 includes, as SLC memory blocks, an $i_{th}$ block 1272 and an $i+1_{th}$ block 1274, includes, as MLC memory blocks, an $i+2_{th}$ block 1276 and an $i+3_{th}$ block 1278, and includes, as TLC memory blocks, an $i+4_{th}$ block 1280 and an $i+5_{th}$ block 1282.

In addition the controller 130 writes and stores data of a command operation corresponding to a command received from the host 102, for example, user data and meta data of a write operation corresponding to a write command, in a plurality of memory blocks of the memory device 150. For example, the controller 130 stores user data and meta data of a write operation corresponding to a write command in, among the plurality of memory blocks of the memory device 150, the memory blocks 1252, 1254, 1256, 1258, 1260, and 1262 included in the first memory block group 1250 or the memory blocks 1272, 1274, 1276, 1278, 1280, and 1282 included in the second memory block group 1270. In this regard, as described above, the controller 130 writes and stores, through a one-shot program, the user data and the meta data corresponding to the write command received from the host 102 in a super memory block including one or more memory blocks among the memory blocks 1252, 1254, 1256, 1258, 1260, and 1262 included in the first memory block group 1250 or among the memory blocks 1272, 1274, 1276, 1278, 1280, and 1282 included in the second memory block group 1270. In other words, the controller 130 stores, through the one-shot program, the user data and the meta data in a super memory block of the first memory block group 1250 or a super memory block of the second memory block group 1270.

In addition, the controller 130 caches and buffers data corresponding to a command (e.g., user data corresponding to a write command) received from the host 102 in a first buffer 1210 included in a memory 144 of the controller 130. That is, the controller 130 stores data segments 1212 of the user data in the first buffer 1210 which is a data buffer/cache, and thereafter stores data segments 1212 stored in the first buffer 1210 in a plurality of memory blocks included in the memory device 150. In other words, the controller 130 writes and stores the data segments 1212 in the memory blocks 1252, 1254, 1256, 1258, 1260, and 1262 included in the first memory block group 1250 or the memory blocks 1272, 1274, 1276, 1278, 1280, and 1282 included in the second memory block group 1270.

As the data segments 1212 of the user data corresponding to the command received from the host 102 are written or stored in the memory blocks 1252, 1254, 1256, 1258, 1260, and 1262 included in the first memory block group 1250 or the memory blocks 1272, 1274, 1276, 1278, 1280, and 1282 included in the second memory block group 1270 of the memory device 150, the controller 130 generates and updates meta data including first and second map data, and stores it in a second buffer 1220 included in the memory 144 of the controller 130. That is, the controller 130 stores meta segments 1222 of the meta data for the user data in the second buffer 1220 as a meta buffer/cache.

That is, the controller 130 stores the meta data for the user data of the command operation corresponding to the command received from the host 102 in the second buffer 1220 of the controller 130. In this regard, as described above, the meta data stored in the second buffer 1220 of the controller 130 includes at least one information selected from the group including information about command data corresponding to the command received from the host 102 (i.e., command data information), information about the command operation corresponding to the command (i.e., command operation information) information about memory blocks of the memory device 150 that perform the command operation (i.e., memory block information), and map data corresponding to the command operation. For example, the map data may include the first map data and the second map data. In the embodiment, the controller 130 stores meta segments 1222 of the meta data in the second buffer 1220.

In addition, the controller 130 stores the meta segments 1222 which are stored in the second buffer 1220, in a plurality of blocks included in the memory devices 150 according to the storage of the corresponding user data. In other words, the controller 130 may write and store the meta segments 1222 in the memory blocks 1252, 1254, 1256, 1258, 1260, and 1262 included in the first memory block group 1250 when the corresponding user data is stored in the first memory block group. Otherwise, the controller 130 may write and store the meta segments 1222 in the memory blocks 1272, 1274, 1276, 1278, 1280, and 1282 included in the second memory block group 1270 of the memory device 150 when the corresponding user data is stored in the second memory block group. In en embodiment, the meta data is stored in the same super block where the corresponding user data is stored.

The write command received from the host 102 includes user data and information about the user data. The information about the user data may include at least one information selected from the group including information, size information and type information of the user data. In particular, a system included in the host 102, such as a file system or the operating system, may include the user data and the type information of the user data in the write command and transmit the write command to the controller 130. The type information of the user data may be included in a reserved region, a tag region, a data set region or the like of the write command. The type information of the user data may be information indicating an attribute of the user data. The write command may include context information or identification information indicating whether the user data stored in the memory blocks is updated after the user data is stored in memory blocks of the memory device 150. That is, the type information of the user data may include information indicating, with regard to the user data stored in the memory blocks of the memory device 150 according to the write command, whether the user data is user data for which only a read operation is performed as only a read command is received from the host 102, or whether the user data is user data for which a write operation (i.e., an update operation) is performed as a write command is received from the host 102. In addition, the type information of the user data may include information indicating a process pattern (e.g., a read/program/write pattern) of the user data, or a data type (e.g., random/sequential/locality) of the user data.

The controller 130 checks the type information of the user data included in the write command received from the host 102 and then programs and stores, in response to the type information of the user data, the user data and the meta data in, among the memory blocks of the memory device 150, the memory blocks 1252, 1254, 1256, 1258, 1260, and 1262 included in the first memory block group 1250, or in the memory blocks 1272, 1274, 1276, 1278, 1280, and 1282 included in the second memory block group 1270.

In particular, the controller 130 checks the type information of the user data and classifies the data segments 1212 stored in the first buffer 1210 and the meta segments 1222 stored in the second buffer 1220 into a first type and a second type. The controller 130 programs and stores data segments and meta segments that are classified as the first type, in the memory blocks 1252, 1254, 1256, 1258, 1260, and 1262 included in the first memory block group 1250 of the memory device 150. The controller 130 programs and stores data segments and meta segments that are classified as the second type, in the memory blocks 1272, 1274, 1276, 1278, 1280, and 1282 included in the second memory block group 1270 of the memory device 150.

The data segments and the meta segments that are classified as the first type are user data for which, with regard to the user data stored in the memory blocks of the memory device 150 according to the write command received from the host 102, only a read command is received from the host 102 and thus only a read operation is performed. The data segments and the meta segments that are classified as the second type are user data for which, with regard to the user data is stored in the memory blocks of the memory device 150 according to the write command received from the host 102, a write command is received from the host 102 and thus a write operation (i.e., an update operation) is performed.

That is, the controller 130 programs and stores the data segments and the meta segments of the user data for which only the read command is received from the host 102 and thus only the read operation is performed, in the memory blocks 1252, 1254, 1256, 1258, 1260, and 1262 included in the first memory block group 1250 of the memory device 150. The controller 130 programs and stores the data segments and the meta segments of the user data for which the update operation is performed according to the write command received from the host 102, in the memory blocks 1272, 1274, 1276, 1278, 1280, and 1282 included in the second memory block group 1270 of the memory device 150.

In this regard, after the controller 130 stores the data segments and the meta segments of the first type in the memory blocks 1252, 1254, 1256, 1258, 1260, and 1262 included in the first memory block group 1250 of the memory device 150, the controller 130 counts, if it receives a read command for the stored user data from the host 102 and performs a read operation, the read operation for the user data. According to a read count of the user data the controller 130 classifies the data segments and the meta segments of the user data stored in the first memory block group 1250 into a third type and a fourth type. The controller 130 migrates and stores data segments and meta segments of the third type to, among the memory blocks 1252, 1254, 1256, 1258, 1260 and 1262 of the first memory block group 1250, the first memory block. The controller 130 migrates and stores data segments and meta segments of the fourth type to, among the memory blocks 1252, 1254, 1256, 1258, 1260, and 1262 of the first memory block group 1250, the second memory block. In this regard, the data segments and the meta segments of the third type may be data segments and meta segments of user data, the read count of which is equal to or greater than a preset threshold value, i.e., hot data. The data segments and the meta segments of the fourth type may be data segments and meta segments of user data, the read count of which is less than a preset threshold value, i.e., cold data.

That is, the controller 130 programs and stores the user data and meta data of the first type in the memory blocks 1252, 1254, 1256, 1258, 1260, and 1262 included in the first memory block group 1250 of the memory device 150. The user data and meta data of the first type is user data and meta data for which only a read operation is performed. Thereafter, the controller 130 migrates and stores the user data and meta data as hot data to the MLC memory blocks 1252, 1254 and 1256, among the memory blocks 1252, 1254, 1256, 1258, 1260, and 1262 of the first memory block group 1250. For example, the controller 130 migrates and stores the hot data to the first memory block included in the MLC memory blocks 1252, 1254 and 1256. The controller 130 migrates and stores the user data and meta data as cold data to the TLC memory blocks 1258, 1260, and 1262, among the memory blocks 1252, 1254, 1256, 1258, 1260, and 1262 of the first memory block group 1250. For example, the controller 130 migrates and stores the cold data to the second memory block included in the TLC memory blocks 1258, 1260, and 1262.

The controller 130 stores the data segments and meta segments of the second type in the SLC memory blocks 1272 and 1274 that are used as buffers or the MLC memory blocks 1276 and 1278, among the memory blocks 1272, 1274, 1276, 1278, 1280, and 1282 included in the second memory block group 1270 of the memory device 150. Thereafter, the controller 130 migrates and stores the data segments and meta segments of the second type stored in the SLC memory blocks 1272 and 1274, to the MLC memory blocks 1276 and 1278 or the TLC memory blocks 1280 and 1282. Also, the controller 130 migrates and stores the data segments and meta segments of the second type stored in the MLC memory blocks 1276 and 1278, to the TLC memory blocks 1280 and 1282.

In an embodiment, for the sake of convenience in explanation, although the following detailed description will be focused on the case where the SLC memory blocks 1272 and 1274 among the memory blocks 1272, 1274, 1276, 1278, 1280, and 1282 included in the second memory block group 1270 of the memory device 150 are used as buffers, as described above, the MLC memory blocks 1276 and 1278 among the memory blocks 1272, 1274, 1276, 1278, and 1282 included in the second memory block group 1270 of the memory device 150 may also be used as buffers. In this case, data segments and meta segments of the second type that is, user data and meta data for which an update operation is performed, are stored in the MLC memory blocks 1276 and 1278, and thereafter migrated to and stored in the TLC memory blocks 1280 and 1282.

Referring to FIG. 13, if a command is received from the host 102, the controller 130 stores when, performing a command operation corresponding to the received command, data segments 1300 of user data in a first buffer 1210 included in the memory 144 of the controller 130.

In this regard, for instance, the data segments 1300 of the user data stored in the first buffer 1210 of the controller 130 includes a data segment 1302 (hereinafter, referred to as a 'zeroth data segment') having LBA or logical page number 0, a data segment 1304 (hereinafter, referred to as a 'first data segment') having logical page number 1, a data segment 1306 (hereinafter, referred to as a 'second data segment') having logical page number 2, a data segment 1308 (hereinafter, referred to as a 'third data segment') having logical page number 3, a data segment 1310 (hereinafter, referred to as a 'fourth data segment') having logical page number 4, a data segment 1312 (hereinafter, referred to as a 'fifth data segment') having logical page number 5, a data segment 1314 (hereinafter, referred to as a 'sixth data segment') having logical page number 6, a data segment 1316 (hereinafter, referred to as a 'seventh data segment') having logical page number 7, a data segment 1318 (hereinafter, referred to as an 'eighth data segment') having logical page number 8, a data segment 1320 (hereinafter, referred to as a 'ninth data segment') having logical page number 9, a data segment 1322 (hereinafter, referred to as a 'tenth data segment') having logical page number 10, a data segment 1324 (hereinafter, referred to as an 'eleventh data segment') having logical page number 11, a data segment 1326 (hereinafter, referred to as a 'twelfth data segment') having logical page number 12, and a data segment 1328 (hereinafter, referred to as a 'thirteenth data segment') having logical page number 13.

If a command is received from the host 102, the controller 130 stores, when performing a command operation corresponding to the received command, meta data for the command operation, in a second buffer 1220 included in the memory 144 of the controller 130. For example, the meta data for the command operation may be meta segments 1330 of meta data including a map data for the user data.

For instance, the meta segments 1330 of the meta data stored in the second buffer 1230 of the controller 130 includes a meta segment 1332 (hereinafter, referred to as a 'zeroth meta segment') having segment index 0 of the meta data, a meta segment 1334 (hereinafter, referred to as a 'first meta segment') having segment index 1 of the meta data, a meta segment 1336 (hereinafter, referred to as a 'second meta segment') having segment index 2 of the meta data, a meta segment 1338 (hereinafter, referred to as a 'third meta segment') having segment index 3 of the meta data, a meta segment 1340 (hereinafter, referred to as a 'fourth meta segment') having segment index 4 of the meta data, a meta segment 1342 (hereinafter, referred to as a 'fifth meta segment') having segment index 5 of the meta data, a meta segment 1344 (hereinafter, referred to as a 'sixth meta segment') having segment index 6 of the meta data, a meta segment 1346 (hereinafter, referred to as a 'seventh meta segment') having segment index 7 of the meta data, a meta segment 1348 (hereinafter, referred to as an 'eighth meta segment') having segment index 8 of the meta data, a meta segment 1350 (hereinafter, referred to as a 'ninth meta segment') having segment index 9 of the meta data, a meta segment 1352 (hereinafter, referred to as a 'tenth meta segment') having segment index 10 of the meta data, a meta segment 1354 (hereinafter, referred to as an 'eleventh meta segment') having segment index 11 of the meta data, a meta segment 1356 (hereinafter, referred to as a 'twelfth meta segment') having segment index 12 of the meta data, and a meta segment 1358 (hereinafter, referred to as a 'thirteenth meta segment') having segment index 13 of the meta data.

As described above, the controller 130 checks the type information of the user data included in the command and classifies the data segments 1300 stored in the first buffer 1210 and the meta segments 1330 stored in the second buffer 1220 into either a first type or a second type. That is, the controller 130 classifies, according to the type information of the user data, the data segments 1300 stored in the first buffer 1210 and the meta segments 1330 stored in the second buffer 1220, into data segments and meta segments of the first type for which only a read operation is performed, and data segments and meta segments of the second type for which an update operation is performed.

For example, in more detail, according to the type information of the user data the controller 130 classifies, among the data segments 1300 stored in the first buffer 1210, the zeroth data segment 1302, the first data segment 1304, the second data segment 1306, the third data segment 1308, the fourth data segment 1310, the fifth data segment 1312 and the sixth data segment 1314, as data segments of the first type. Also, the controller 130 classifies the seventh data segment 1316, the eighth data segment 1318, the ninth data segment 1320, the tenth data segment 1322, the eleventh data segment 1324, the twelfth data segment 1326 and the thirteenth data segment 1328, as data segments of the second type.

Moreover, according to the type information of the user data, the controller 130 classifies, among the meta segments 1330 stored in the second buffer 1220, the zeroth meta segment 1332, the first meta segment 1334, the second meta segment 1336 the third meta segment 1338, the fourth meta segment 1340, the fifth meta segment 1342 and the sixth meta segment 1344, as meta segments of the first type. Also, the controller 130 classifies the seventh meta segment 1346, the eighth meta segment 1348, the ninth meta segment 1350 the tenth meta segment 1352, the eleventh meta segment 1354, the twelfth meta segment 1355 and the thirteenth meta segment 1358, as data segments of the second type.

The controller 130 stores the data segments 1302, 1304, 1306, 1308, 1310, 1312, and 1314 and the meta segments 1332, 1334, 1336, 1338, 1340, 1342, and 1344 of the first type in, among the memory blocks of the memory device 150, the memory blocks 1252, 1254, 1256, 1258, 1260, and 1262 included in the first memory block group 1250. In this regard, the controller 130 programs and stores the zeroth data segment 1302 in the zeroth page of the zeroth block 1252, programs and stores the first data segment 1304 in the first page of the zeroth block 1252, programs and stores the second data segment 1306 in the second page of the zeroth block 1252, programs and stores the third data segment 1308 in the third page of the zeroth block 1252, programs and stores the fourth data segment 1310 in the fourth page of the zeroth block 1252, programs and stores the fifth data segment 1312 in the fifth page of the zeroth block 1252, and programs and stores the sixth data segment 1314 in the sixth page of the zeroth block 1252. Furthermore, the controller 130 programs and stores the zeroth meta segment 1332 in the zeroth page of the first block 1254, programs and stores the first meta segment 1334 in the first page of the first block 1254 programs and stores the second meta segment 1336 in the second page of the first block 1254, programs and stores the third meta segment 1338 in the third page of the first block 1254, programs and stores the fourth meta segment 1340 in the fourth page of the first block 1254, programs and stores the fifth meta segment 1342 in the fifth page of the first block 1254, and programs and stores the sixth meta segment 1344 in the sixth page of the first block 1254.

When a read command is received from the host 102 and thus a read operation for the data segments 1302, 1304, 1306, 1308, 1310, 1312, and 1314 and the meta segments 1332, 1334, 1336, 1338, 1340, 1342, and 1344 stored in the pages of the zeroth block 1252 and the first block 1254 of the first memory block group 1250 is performed, the controller 130 counts the read operation. According to a read count, the controller 130 classifies the data segments 1302, 1304, 1306, 1308, 1310, 1312, and 1314 and the meta segments 1332, 1334, 1336, 1338, 1340, 1342, and 1344 stored in the pages of the zeroth block 1252 and the first block 1254, into hot data of the third type and cold data of the fourth type.

For instance, in accordance with the read count, the controller 130 classifies, among the data segments 1302, 1304, 1306, 1308, 1310, 1312, and 1314 stored in the pages of the zeroth block 1252, the zeroth data segment 1302, the first data segment 1304, the second data segment 1306 as hot data of the third type. Also, the controller 130 classifies the third data segment 1308, the fourth data segment 1310, the fifth data segment 1312 and the sixth data segment 1314 as cold data of the fourth type. Furthermore, in accordance with the read count, the controller 130 classifies, among the meta segments 1332, 1334, 1336, 1338, 1340, 1342, and 1344 stored in the pages of the first block 1254, the zeroth meta segment 1332, the first meta segment 1334, the second meta segment 1336 as hot data of the third type. Also, the controller 130 classifies the third meta segment 1338, the fourth meta segment 1340, the fifth meta segment 1342 and the sixth meta segment 1344 as cold data of the fourth type.

The controller 130 migrates and stores the data segments 1302, 1304, and 1306 and the meta segments 1332, 1334, and 1336 of the third type stored in the pages of the zeroth block 1252 and the first block 1254, to, among the memory blocks 1252, 1254, 1256, 1258, 1260, and 1262 of the first memory block group 1250, the first memory block (e.g., pages of the second block 1256). That is, the controller 130 migrates and stores the zeroth data segment 1302 to the zeroth page of the second block 1256, migrates and stores the first data segment 1304 to the first page of the second block 1256, migrates and stores the second data segment 1306 to the second page of the second block 1256, migrates and stores the zeroth meta segment 1332 in the third page of the second block 1256, migrates and stores the first meta segment 1334 in the fourth page of the second block 1256, and migrates and stores the second meta segment 1336 in the fifth page of the second block 1256.

The controller 130 migrates and stores the data segments 1308, 1310, 1312 and 1314 and the meta segments 1338, 1340, 1342 and 1344 of the fourth type stored in the pages of the zeroth block 1252 and the first block 1254, to, among the memory blocks 1252, 1254, 1256, 1258, 1260, and 1262 of the first memory block group 1250, the second memory block (e.g., pages of the third block 1258). That is, the controller 130 migrates and stores the third data segment 1308 to the zeroth page of the third block 1258, migrates and stores the fourth data segment 1310 to the first page of the third block 1258, migrates and stores the fifth data segment 1312 to the second page of the third block 1258, migrates and stores the sixth data segment 1314 to the third page of the third block 1258, migrates and stores the third meta segment 1338 to the fourth page of the third block 1258, migrates and stores the fourth meta segment 1340 to the fifth page of the third block 1258 migrates and stores the fifth meta segment 1342 to the sixth page of the third block 1258, and migrates and stores the sixth meta segment 1344 to the seventh page of the third block 1258.

The controller 130 stores the data segments 1316, 1318, 1320, 1322, 1324, 1326, and 1328 and the meta segments 1346, 1348, 1350, 1352, 1354, 1356, and 1358 of the second type in, among the memory blocks of the memory device 150, the memory blocks 1272, 1274, 1276, 1278, 1280, and 1282 included in the second memory block group 1270. In particular, the controller 130 stores, using the SLC memory blocks 1272 and 1274 as buffers, the data segments 1316, 1318, 1320, 1322, 1324, 1326, and 1328 and the meta segments 1346, 1348, 1350, 1352, 1354, 1356, and 1358 of the second type in the SLC memory blocks 1272 and 1274, and thereafter migrates and stores the data segments 1316, 1318, 1320, 1322, 1324, 1326, and 1328 and the meta segments 1346, 1348, 1350, 1352, 1354, 1356, and 1358 stored in the SLC memory blocks 1272 and 1274, to the MLC memory blocks 1276 and 1278 or the TLC memory blocks 1280 and 1282.

In this regard, the controller 130 programs and stores the seventh data segment 1316 in the zeroth page of the $i_{th}$ block 1272, programs and stores the eighth data segment 1318 in the first page of the $i_{th}$ block 1272, programs and stores the ninth data segment 1320 in the second page of the $i_{th}$ block 1272, programs and stores the tenth data segment 1322 in the third page of the $i_{th}$ block 1272, programs and stores the eleventh data segment 1324 in the fourth page of the $i_{th}$ block 1272, programs and stores the twelfth data segment 1326 in the fifth page of the $i_{th}$ block 1272, and programs and stores the thirteenth data segment 1328 in the sixth page of the $i_{th}$ block 1272. Furthermore, the controller 130 programs and stores the seventh meta segment 1346 in the zeroth page of the $i+1_{th}$ block 1274, programs and stores the eighth meta segment 1348 in the first page of the $i+1_{th}$ block 1274, programs and stores the ninth meta segment 1350 in the second page of the $i+1_{th}$ block 1274, programs and stores the tenth meta segment 1352 in the third page of the $i+1_{th}$ block 1274, programs and stores the eleventh meta segment 1354 in the fourth page of $i+1_{th}$ block 1274, programs and stores the twelfth meta segment 1356 in the fifth page of the $i+1_{th}$ block 1274, and programs and stores the thirteenth meta segment 1358 in the sixth page of the $i+1_{th}$ block 1274.

The controller 130 migrates and stores the data segments 1316, 1318, 1320, 1322, 1324, 1326, and 1328 and the meta segments 1346, 1348, 1350, 1352, 1354, 1356, and 1358 stored in the $i_{th}$ block 1272 and the $i+1_{th}$ block 1274 of the second memory block group 1270, to the MLC memory blocks 1276 and 1278 or the TLC memory blocks 1280 and 1282.

In the embodiment, for the sake of convenience in explanation, although the following detailed description will be focused on the case where the data segments 1316, 1318, 1320, 1322, 1324, 1326, and 1328 and the meta segments 1346, 1348, 1350, 1352, 1354, 1356, and 1358 stored in the SLC memory blocks 1272 and 1274 are migrated to and stored in the MLC memory blocks 1276 and 1278, the data segments 1316, 1318, 1320, 1322, 1324, 1326 and 1328 and the meta segments 1346, 1348, 1350, 1352, 1354, 1356, and 1358 stored in the SLC memory blocks 1272 and 1274 may be migrated to and stored in the TLC memory blocks 1280 and 1282.

That is, the controller 130 migrates and stores the data segments 1316, 1318, 1320, 1322, 1324, 1326, and 1328 stored in the pages of the $i_{th}$ block 1272 of the second memory block group 1270, to the pages of the $i+2_{th}$ block 1276, and migrates and stores the meta segments 1346, 1348, 1350, 1352, 1354, 1356, and 1358 stored in the pages of the $i+1_{th}$ block 1274 of the second memory block group 1270, to the pages of the $i+3_{th}$ block 1278. In this regard, the controller 130 migrates and stores the seventh data segment 1316 to the zeroth page of the $i+2_{th}$ block 1276, migrates and stores the eighth data segment 1318 to the first page of the $i+2_{th}$ block 1276, migrates and stores the ninth data segment 1320 to the second page of the $i+2_{th}$ block 1276, migrates and stores the tenth data segment 1322 to the third page of the $i+2_{th}$ block 1276, migrates and stores the eleventh data segment 1324 to the fourth page of the i+2$_{th}$ block 1276, migrates and stores the twelfth data segment 1326 to the fifth page of the i+2$_{th}$ block 1276, and migrates and stores the thirteenth data segment 1328 to the sixth page of the i+2$_{th}$ block 1276. Furthermore, the controller 130 migrates and stores the seventh meta segment 1346 to the zeroth page of the i+3$_{th}$ block 1278, migrates and stores the eighth meta segment 1348 to the first page of the i+3$_{th}$ block 1278, migrates and stores the ninth meta segment 1350 to the second page of the i+3$_{th}$ block 1278, migrates and stores the tenth meta segment 1352 to the third page of the i+3$_{th}$ block 1278, migrates and stores the eleventh meta segment 1354 to the fourth page of i+3$_{th}$ block 1278, migrates and stores the twelfth meta segment 1356 to the fifth page of the i+3$_{th}$ block 1278, and migrates and stores the thirteenth meta segment 1358 to the sixth page of the i+3$_{th}$ block 1278.

As such, in the memory system according to the embodiment, in the case where a command operation corresponding to a command received from the host 102 is performed, user data and meta data for the command operation are stored in the memory 144 of the controller 130. In other words the data segments 1300 of the user data are stored in the first buffer 1210 which is a data buffer/cache included in the memory 144 of the controller 130, and the meta segments 1330 of the meta data are stored in the second buffer 1220 which is a meta buffer/cache included in the memory 144 of the controller 130. The type information of the user data included in the command received from the host 102 is checked, and, thereafter, in accordance with the type information of the user data, the data segments 1300 stored in the first buffer 1210 and the meta segments 1330 stored in the second buffer 1220 are classified into one of the first type and the second type. Data segments and meta segments of the first type are programmed and stored in the memory blocks 1252, 1254, 1256, 1258, 1260, and 1262 included in the first memory block group 1250 of the memory device 150, while data segments and meta segments of the second type are programmed and stored in the memory blocks 1272, 1274, 1276, 1278, 1280, and 1282 included in the second memory block group 1270 of the memory device 150. Furthermore, in the memory system according to the embodiment, the data segments and meta segments stored in the memory blocks 1252, 1254, 1256, 1258, 1260, and 1262 of the first memory block group 1250 are classified into one of the third type and fourth type according to the read counts of the data segments and meta segments stored in the memory blocks 1252, 1254, 1256, 1258, 1260, and 1262 of the first memory block group 1250. Data segments and meta segments of the third type are migrated to and stored in the first memory block among the memory blocks 1252, 1254, 1256, 1258, 1260, and 1262 of the first memory block group 1250. Data segments and meta segments of the fourth type are migrated to and stored in the second memory block among the memory blocks 1252, 1254, 1256, 1258, 1260, and 1262 of the first memory block group 1250. In addition, in the memory system according to the embodiment, among the memory blocks 1272, 1274, 1276, 1278, 1280, and 1282 of the second memory block group 1270, the SLC memory blocks 1272 and 1274 or the MLC memory blocks 1276 and 1278 are used as buffers. Thus, data segments and meta segments of the second type are programmed and stored in the SLC memory blocks 1272 and 1274 or the MLC memory blocks 1276 and 1278 which are buffers. The data segments and meta segments stored in the SLC memory blocks 1272 and 1274 are migrated to and stored in the MLC memory blocks 1276 and 1278 or the TLC memory blocks 1280 and 1282. The data segments and meta segments stored in the MLC memory blocks 1276 and 1278 are migrated to and stored in the TLC memory blocks 1280 and 1282.

Consequently, in the memory system according to an embodiment of the present invention, when a command operation corresponding to a command received from the host 102 is performed, user data and meta data for the command operation are rapidly and stably processed. As a result, the command operation is rapidly and stably performed. Furthermore, in the memory system according to an embodiment of the present invention, in accordance with type information, the user data and the meta data are respectively programmed on, migrated to and stored in corresponding memory blocks among the memory blocks of the memory device 150. Therefore, use efficiency of the memory device 150 is enhanced, and a read operation and an update operation for data stored in the memory blocks of the memory device 150 are rapidly performed. Hereinafter, an operation of processing data in the memory system according to an embodiment of the present invention will be described with reference to FIG. 14.

Referring to FIG. 14, at step 1410, when performing a command operation corresponding to a command received from the host 102, the memory system checks the data segments and meta segments of the received data. More specifically, for example, the memory system stores data segments of user data and meta segments of meta data for the command operation, in the memory 144 of the controller 130. Thereafter, the memory system checks type information of the user data included in the command, so as to program the data segments and meta segments stored in the memory 144 of the controller 130, on memory blocks included in the first memory block group of the memory device 150 or memory blocks included in the second memory block group. Then, the memory system checks and classifies the data segments and the meta segments according to the type information.

At step 1420, the memory system checks the open memory blocks. For example, the open memory blocks are checked from the memory blocks included in the first memory block group and the memory blocks included in the second memory block group that correspond to the data segments and meta segments stored in the memory 144 of the controller 130.

Subsequently, at step 1430, the data segments and meta segments stored in the memory 144 of the controller 130 are respectively programmed and stored, in accordance with the type information of data, in the memory blocks included in the first memory block group or the memory blocks included in the second memory block group of the memory device 150. The data segments and meta segments stored in the memory blocks of the second memory block group are programmed and stored in the SLC memory blocks or MLC memory blocks that are used as buffers, and then migrated to and stored in the MLC memory blocks or the TLC memory blocks.

After, at step 1440, read counts for the data segments and meta segments stored in the memory blocks of the first memory block group are checked. Finally, at step 1450, the data segments and meta segments stored in the memory blocks of the first memory block group are migrated to and stored in the first memory block or the second memory block among the memory blocks of the first memory block group, in accordance with the read counts.

In this regard, with reference to FIGS. 12 and 13, there has been illustrated the operation in which, when the command operation corresponding to the command received from the host is performed, the type information of the user data that is included in the command is checked and the user data and the meta data of the user data are programmed on, migrated to and stored in the memory blocks of the memory device. Therefore, detailed description related to this will be omitted.

As described above, in the memory system and the operating method thereof in accordance with embodiments, it is possible to minimize the complexity and performance deterioration of the memory system and maximize the use efficiency of the memory device, thus making it possible to rapidly and reliably process data to the memory device.

Although various embodiments have been described for illustrative purposes, it will be apparent to those skilled in the art that various changes and modifications may be made without departing from the spirit and scope of the disclosure as defined in the following claims.

What is claimed is:

1. A memory system comprising:
    a memory device including a plurality of memory blocks; and
    a controller suitable for dividing the memory blocks into a first group and a second group, performing a command operation corresponding to a command received from a host, and storing segments of user data and meta data for the command operation in memory blocks included in the first group or memory blocks included in the second group,
    wherein the controller classifies the segments of the user data and meta data into a first type which are segments of the user data for performing a read operation, and a second type which are segments of the user data for performing a write operation, in accordance with type information which indicates a read, program, or write pattern of the user data and is included in the meta data, and the controller stores segments of the first type in the memory blocks of the first group, and stores segments of the second type in the memory blocks of the second group,
    wherein when the controller classifies the segments of the user data as the first type, the controller performs the read operation for the segments of the user data in the first group,
    wherein when the controller classifies the segments of the user data as the second type, the controller performs the write operation for the segments of the user data into the second group, then generates or updates the segments of meta data which correspond to the user data, in the second group, and
    wherein the segments of meta data which are generated or updated include first map data which is mapping information of a logical address to a physical address (L2P) for the user data, second map data which is mapping information of a physical address to a logical address (P2L) for the user data, size information, command data information, and command operation information.

2. The memory system according to claim 1, wherein the controller checks a read count in accordance with the read operation for the segments of the first type, and the controller classifies the segments of the first type into a third type and a fourth type in accordance with the read count.

3. The memory system according to claim 2, wherein the controller migrates and stores segments of the third type stored in the memory blocks of the first group, to a first memory block of the first group, and the controller migrates and stores segments of the fourth type stored in the memory blocks of the first group, to a second memory block of the first group.

4. The memory system according to claim 3, wherein the first memory block includes a Multi Level Cell (MLC) memory block, and the second memory block includes a Triple Level Cell (TLC) memory block.

5. The memory system according to claim 2,
    wherein the segments of the third type are segments of hot data, and the segments of the fourth type are segments of cold data.

6. The memory system according to claim 1, wherein the segments of the second type are segments of the user data and meta data for which, after being stored in the memory blocks of the second group, an update operation of the command operation is performed.

7. The memory system according to claim 6, wherein the controller stores the segments of the second type in first memory blocks, among the memory blocks of the second group, and then migrates and stores the segments of the second type to second memory blocks.

8. The memory system according to claim 7, wherein the first memory blocks include Single Level Cell (SLC) memory blocks and Multi Level Cell (MLC) memory blocks, and wherein the second memory blocks include the MLC memory blocks and Triple Level Cell (TLC) memory blocks.

9. An operating method of a memory system comprising:
    receiving a command from a host;
    checking user data included in the command and type information of the user data;
    dividing a plurality of memory blocks of a memory device into a first group and a second group; and
    performing a command operation corresponding to the command, and storing segments of the user data and meta data for the command operation in memory blocks included in the first group or memory blocks included in the second group, in accordance with the type information,
    wherein the storing comprises:
    classifying the segments of the user data and meta data into a first type which are segments of the user data for performing a read operation, and a second type which are segments of the user data for performing a write operation, in accordance with the type information which indicates a read, program, or write pattern of the user data; and
    storing segments of the first type in the memory blocks of the first group, and storing segments of the second type in the memory blocks of the second group,
    wherein when the segments of the user data are classified as the first type, the controller performs the read operation for the segments of the user data in the first group,
    wherein when the segments of the user data are classified as the second type, the controller performs the write operation for the segments of the user data into the second group, then generates or updates the segments of the meta data which correspond to the segments of the user data, in the second group, and
    wherein the segments of meta data which are generated or updated include first map data which is mapping information of a logical address to a physical address (L2P) for the user data, second map data which is mapping information of a physical address to a logical address (P2L) for the user data, size information, command data information, and command operation
    dividing a plurality of memory blocks of a memory device into a first group and a second group; and performing a command operation corresponding to the command, and storing segments of the user data and meta data for the command operation in memory blocks included in the first group or memory blocks included in the second group, in accordance with the type information, wherein the storing comprises:

classifying the segments of the user data and meta data into a first type which are segments of the user data for performing a read operation, and a second type which are segments of the user data for performing a write operation, in accordance with the type information which indicates a read, program, or write pattern of the user data; and storing segments of the first type in the memory blocks of the first group, and storing segments of the second type in the memory blocks of the second group, wherein when the segments of the user data are classified as the first type, the controller performs the read operation for the segments of the user data in the first group, wherein when the segments of the user data are classified as the second type, the controller performs the write operation for the segments of the user data into the second group, then generates or updates the segments of the meta data which correspond to the segments of the user data, in the second group, and wherein the segments of meta data which are generated or updated include first map data which is mapping information of a logical address to a physical address (L2P) for the user data, second map data which is mapping information of a physical address to a logical address (P2L) for the user data, size information, command data information, and command operation information.

10. The operating method according to claim 9, further comprising:

checking a read count in accordance with the read operation for the segments of the first type; and classifying the segments of the first type into a third type and a fourth type in accordance with the read count.

11. The operating method according to claim 10, further comprising:

migrating and storing segments of the third type stored in the memory blocks of the first group, to a first memory block of the first group; and migrating and storing segments of the fourth type stored in the memory blocks of the first group, to a second memory block of the first group.

12. The operating method according to claim 11, wherein the first memory block includes a Multi Level Cell (MLC) memory block, and wherein the second memory block includes a Triple Level Cell (TLC) memory block.

13. The operating method according to claim 10, wherein the segments of the third type are segments of hot data, and wherein the segments of the fourth type are segments of cold data.

14. The operating method according to claim 9, wherein the segments of the second type are segments of the user data and meta data for which, after being stored in the memory blocks of the second group, an update operation of the command operation is performed.

15. The memory system according to claim 14, wherein the storing comprises migrating and storing the segments of the second type in first memory blocks, among the memory blocks of the second group, and then migrating and storing the segments of the second type to second memory blocks.

16. The operating method according to claim 15, wherein the first memory blocks include Single Level Cell (SLC) memory blocks and Multi Level Cell (MLC) memory blocks, and the second memory blocks include the MLC memory blocks and Triple Level Cell (TLC) memory blocks.

* * * * *